United States Patent [19]
Matsuura et al.

[11] Patent Number: 6,161,714
[45] Date of Patent: *Dec. 19, 2000

[54] CARGO CONTAINER

[75] Inventors: Masashi Matsuura; Nobuhiko Shimizu; Masayoshi Yamagiwa; Hiroshi Ohnishi, all of Ehime-ken, Japan

[73] Assignee: Toray Industries, Inc., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/594,449

[22] Filed: Jan. 31, 1996

[30] Foreign Application Priority Data

Jul. 14, 1995 [JP] Japan .................... 7-178868

[51] Int. Cl.⁷ .............. B65D 6/28; B65D 88/12
[52] U.S. Cl. .......... 220/1.5; 220/604; 220/668; 220/692
[58] Field of Search .............. 220/1.5, 652, 644, 220/645, 604, 610, 622, 668, 692; 428/297.4, 299.1, 300.7, 902

[56] References Cited

U.S. PATENT DOCUMENTS

| | | | |
|---|---|---|---|
| 1,789,642 | 1/1931 | Wirth | 220/692 X |
| 3,598,273 | 8/1971 | Rau et al. | 220/1.5 |
| 3,955,700 | 5/1976 | Pedraza | 220/645 |
| 4,048,360 | 9/1977 | Jonda | 428/35 |
| 4,339,490 | 7/1982 | Yoshioka et al. | 428/213 |
| 4,622,086 | 11/1986 | Puck et al. | 156/166 |
| 4,784,920 | 11/1988 | Machida | 428/542.8 |
| 5,073,244 | 12/1991 | Korner et al. | |
| 5,255,806 | 10/1993 | Korzeniowski et al. | |
| 5,277,973 | 1/1994 | Yamamura et al. | 428/367 |
| 5,360,129 | 11/1994 | Lee | 220/1.5 |
| 5,396,932 | 3/1995 | Homma et al. | 139/420 A |
| 5,449,081 | 9/1995 | Sjostedt et al. | 220/1.5 |
| 5,529,177 | 6/1996 | Podd et al. | 206/204 |

FOREIGN PATENT DOCUMENTS

| | | |
|---|---|---|
| 0 389 467 | 9/1990 | European Pat. Off. . |
| 26 36 557 | 2/1978 | Germany . |
| 26 36 557 A1 | 2/1978 | Germany . |
| 6184324 | 7/1994 | Japan . |
| 426 644 | 6/1967 | Switzerland . |
| 2 195 613 | 4/1988 | United Kingdom . |

OTHER PUBLICATIONS

European Patent Office Communication with European Search Report for European Patent application No. 96300204.3 dated Nov. 29, 1996.

*Primary Examiner*—Stephen Castellano
*Assistant Examiner*—Niki M. Eloshway
*Attorney, Agent, or Firm*—Morrison & Foerster LLP

[57] ABSTRACT

A cargo container which has sufficient strength and rigidity. The container includes side walls, a roof and a base, wherein at least the side walls are made of FRP (fiber reinforced plastics) plates, and wherein adjacent two sides of the plates are made of an integrally formed continuous FRP panel. The cargo container is suited for use in an aircraft, ship, freight train or the like.

24 Claims, 3 Drawing Sheets

CARGO CONTAINER

BACKGROUND OF THE INVENTION

1. Field of the Invention

The present invention relates to a cargo container for an aircraft (i.e., an air cargo container), ships, freight trains or the like.

2. Description of the Relevant Art

Among various means of transport, the gross weight of an airplane is a substantial factor, and because even a slight reduction in weight is significant, FRP (i.e., fiber reinforced plastics) are now being used in many portions of an airplane.

Containers for an aircraft are absolutely necessary for carrying cargoes and passengers' baggages. A single airplane (particularly, an airplane used in an international flight), for example, is loaded with numerous containers. A freight plane, for example, can accommodate more than 100 containers. Consequently, the reduction in weight of the containers is effectively economical.

One presently used standard container of about 2 meters in width, about 1.5 meters in depth, and about 1.6 meters in height weighs about 90 kg. It has been said that if the weight of an airplane, used in, e.g., an international flight, can be reduced by 1 kg, the operation cost can be reduced by approximately 100 dollars per year. Despite such knowledge, little has been achieved in terms of reducing the weight of aircraft cargo containers.

The presently used containers are made of aluminum alloy. They are roughly handled when loaded into or unloaded from aircrafts; and many problems occur with such aluminum alloy containers (such as, forks of forklifts being able to pierce such containers, sustaining damage when colliding with each other or with cargoes contained therein, and requiring frequent repairs). Furthermore, with the recent increase of products being directly transported from places of production to consumers, the demand for heat insulated transport has thus increased. However, because aluminum alloy is high in heat conductivity, a heat insulating material must be used in large quantity to enhance heat insulation capability. Furthermore, dew condensation occurs on the outer surface, which contributes to yet another problem in the use of such aluminum alloy containers.

On the other hand, most of the presently used containers have a structure in the form of a box assembled by riveting or welding aluminum alloy plates onto an aluminum alloy frame together with reinforcing materials (such as, gussets). The above-mentioned standard container is made by assembling more than 50 parts. Further, in assembling such standard containers, more than 500 rivets are used. Such containers are heavy and require enormous time and cost in manufacture and assembling.

Furthermore, the presently used containers must use frames with a material having a large section modulus in order to secure the entire strength and rigidity of such containers. However, such frames contribute in the inability of such containers to have reduced weights.

As a method for solving the above problems of the containers used for aircrafts, JP-A-94-48480, e.g., proposes a container for an aircraft which includes sandwiched plates with an FRP as the outer skin and a foam as the core, along with the use of joining flanges therearound so that the respectively adjacent sandwiched plates may be joined through the flanges to form a box structure. Because this container uses an FRP and does not require a large frame, it is lighter in weight than the conventional aluminum alloy containers. However, because such containers do not use frames, the sandwiched plates used therein must be thick; as such, the intended beneficial effects are reduced. Furthermore, because of the joining structures in such containers, the manufacture and assembling thereof require a significant of time, effort and cost.

A need was therefore felt to provide a cargo container which avoids the above-discussed problems inherent in conventional containers.

It is therefore an object of the present invention to provide a container which is not only lighter in weight and higher in strength, but also excellent in heat insulation capability.

It is another object of the present invention to provide a container which is ideal for use, especially, in an aircraft, lighter in weight, and sufficiently strong and rigid.

It is another object of the present invention to provide a container which is also ideal for use in ships, freight trains or the like.

It is still another object of the present invention to provide a container which can be manufactured and assembled efficiently at far less time and cost.

SUMMARY OF THE INVENTION

The aforementioned and other objects of the present invention are accomplished by providing a container having a frame, side walls, a roof and a base. At least the side walls are made of an FRP. Also, the side wall may be comprised of at least two FRP panels used as one set for each side, with a gap formed therebetween or the gap may be packed with a heat insulating material or contain a desiccant.

Additionally, the container of the present invention is preferably comprised of at least two adjacent sides of the side walls, the roof and the base being composed of an integrally formed continuous FRP panel.

The two adjacent sides can be side walls or a side wall and the roof or a side wall and the base. Furthermore, at least three more adjacent plates can also be formed as an integrally formed continuous FRP panel or at least two adjacent side walls and the roof or a base can be formed as an integrally formed continuous FRP panel. Moreover, at least one side wall and the roof and the base can also be formed as an integrally formed continuous FRP panel.

The kinds of reinforcing fibers of the FRP, which make the side walls, can be glass fibers or polyaramid fibers, but carbon fibers (being excellent in specific strength and specific modulus) or a woven carbon fiber fabric is preferable. More particularly, if a woven carbon fiber fabric of 450 kgf/mm$^2$ or more in tensile strength $\sigma_f$ and 1.7% or more in elongation $\delta$ is used, the resistance against a piercing impact on the FRP can be more than that on the aluminum alloy plates used in the conventional container.

The reinforcing fibers can be unidirectional, but are preferably of a woven fabric as described above. The woven fabric may be of a plain weave, satin weave, multiple weave or the like, as is well known, but plain weave is preferable, since it is strong due to the constraining force of the weft and warp threads and can enhance the resistance against a piercing impact on the side walls.

The matrix resin of the FRP can be any of an ordinary thermosetting resin, such as, epoxy resin, unsaturated polyester resin, vinyl ester resin and phenol resin or a thermoplastic resin, such as, nylon resin and ABS resin. However, in view of the possibility of the occurrence of a fire, a flame proofing phenol resin, flame proofing epoxy resin or flame proofing unsaturated polyester resin is preferable.

The side walls can be readily produced by any of the ordinary FRP molding methods, such as, autoclave molding of cross-laminated unidirectional prepregs or laminated woven prepreg fabrics, RTM molding or hand lay up of, such as, preform or reinforcing fibers.

The roof and the base can also be made like the side walls. However, the roof can also be a plate made of synthetic resin, such as, polyamide resin, polypropylene resin, polyethylene resin, polyvinyl chloride resin, acrylic resin or polycarbonate resin, since it is less liable to be flawed than the side walls. The base is preferably made of aluminum alloy since it contacts a carrier equipment, such as, a rollover conveyor.

The integrally formed continuous FRP panel, which forms the two or more adjacent plates, can be obtained by autoclave molding of unidirectional prepregs or woven prepregs laminated in a mold, or molding a preform or the like of reinforcing fibers by RTM or hand lay up method or pultrusion method or the method stated in U.S. Pat. No. 4,902,215 (or the like) or any other general FRP molding method.

Other parts of the container, which are made of materials other than FRP, such as the plates, frame and door can be made of any conventional metallic material, such as, aluminum alloy or steel or any other material. However, it is preferable to use a material excellent in specific strength and specific modulus (such as, aluminum alloy as a metallic material).

FRP-made parts, such as, side walls, a roof and a base, and the integrally formed continuous FRP panel can be directly joined with the other parts by using rivets or an adhesive or by using rivets, welding or an adhesive through any reinforcing material (such as, gusset or frame).

In cases where rivets or bolts are used, when the container wall is hit with, for example, a fork of a forklift, the wall can be broken at the hit portion and around the holes for the rivets or bolts because the resistance against the piercing impact of the FRP is higher than that of an aluminum plate. In such a case, the container cannot be repaired without replacing at least one wall and such repair is thus expensive. On the other hand, in the case of a container made of an aluminum alloy plate, the break is a hole-formation type, and thus, the container can be economically repaired with the use of a patch.

In order to solve such problems of an FRP container, it the mount portions for the holes for the rivets or bolts are made thicker than other portions of the container. For example, it is preferable to additionally laminate prepregs around the holes and the mold in an autoclave. Alternatively, in case where resin transfer molding or hand lay up is applied, a desired amount of reinforcing fibers should be additionally laminated around the portion where holes are formed.

In order to enhance the strength and rigidity of the entire container, the integrally formed continuous FRP panel can also be a FRP sandwiched plate with the FRP panels as the outer skin. In such a case, the core of the FRP sandwiched plate can be a foam made of a thermoplastic resin, such as polyethylene, polypropylene, polyvinyl chloride, polystyrene or ABS or a foam made of a thermosetting resin such as phenol, epoxy, silicone or polyurethane or a honeycomb made of aluminum or meta aramid resin.

In order to obtain a high strength high rigidity container lighter in weight, the side walls, a roof and/or a base made of the FRP can be partially reinforced with a sandwiched structural rib or hollow structural rib with the FRP as the outer skin.

Furthermore, the sandwiched structural rib or hollow structural rib can be provided at the inside corner between the side walls or between a side wall and a roof or between a side wall and the base made of the integrally formed continuous FRP panel. In this case, since the sandwiched structural rib or hollow structural rib shares the load applied to the entire container (like the frame of the conventional container for an aircraft), the side walls, a roof and/or a base made of the FRP can be preferably thinner so as to make a very strong and highly rigid container lighter in weight.

The sandwiched structural rib and hollow structural rib can be assembled with the FRP panel as the outer skin, the core and the inner skin located on the side opposite to the FRP by applying an adhesive or the like, but if such portions are formed together at the molding of the FRP, the time for post-processing and assembling can be saved. In this case, the inner skin located on the side opposite to the FRP is molded beforehand.

The core of the sandwiched structural rib can be a foam made of a thermoplastic resin, such as, polyethylene, polypropylene, polyvinyl chloride, polystyrene or ABS or a foam made of a thermosetting resin, such as, phenol, epoxy, silicone or polyurethane or a honeycomb made of aluminum or meta aramid resin. For the inner skin, any material can be used, but when adhesiveness and linear expansion coefficient are taken into account, it is preferable to use a material similar to the integrally formed continuous FRP panel used as the outer skin.

The reinforcing fibers in the FRP can be of any style, but it is preferable that such fibers are continuous at least through the one set of two adjacent sides. Because the use of continuous reinforcing fibers can secure the strength and rigidity of the entire container, the container can be made with the use of thinner plates; thereby, significantly reducing the container weight.

These and other features of the present invention will be understood upon reading of the following description along with the drawings.

DESCRIPTION OF THE PREFERRED EMBODIMENTS

Figure 1:
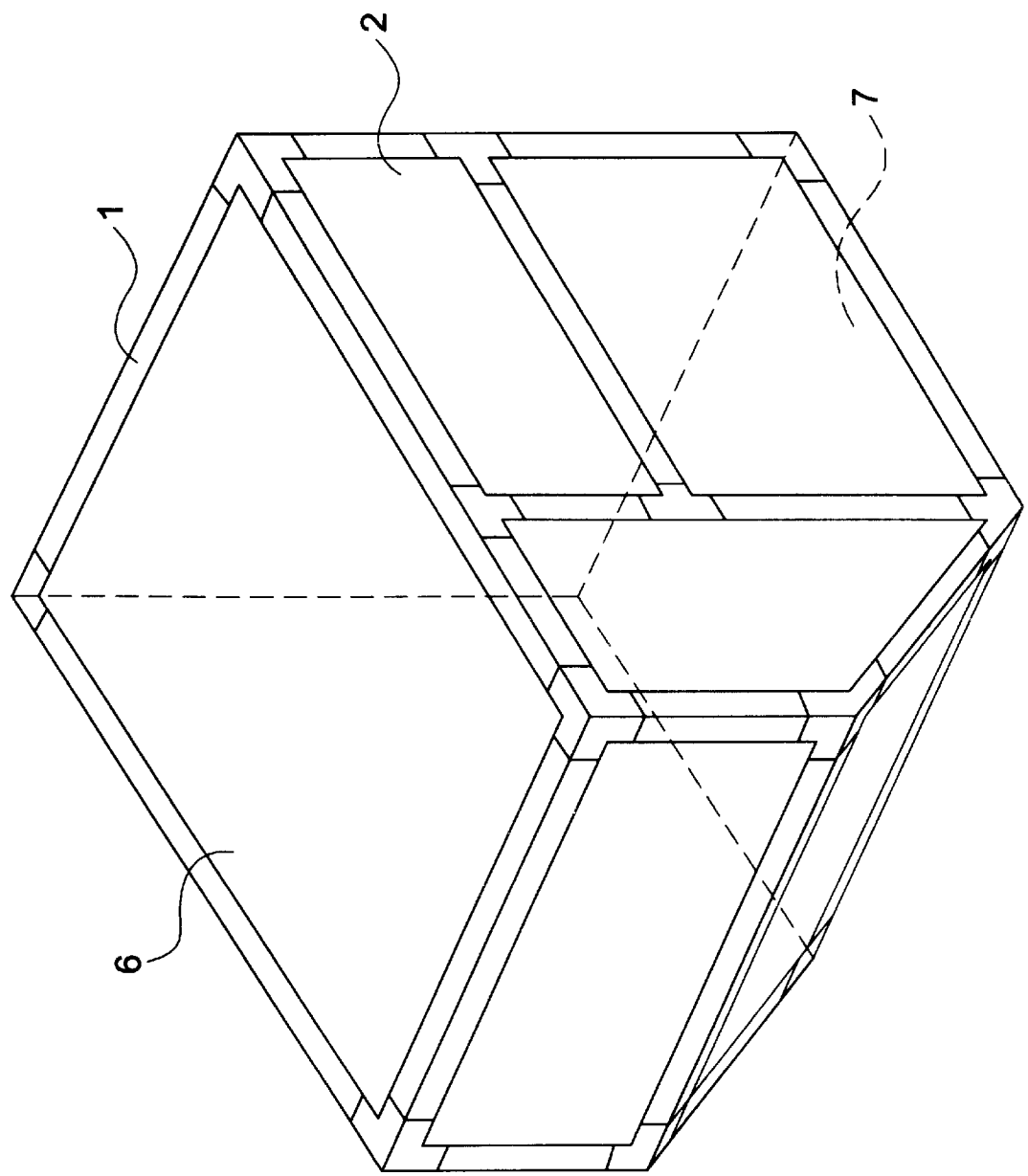
FIG. 1 is a schematic perspective view showing, as an embodiment of the present invention, the cargo container used in, e.g., an aircraft.
Figure 2:
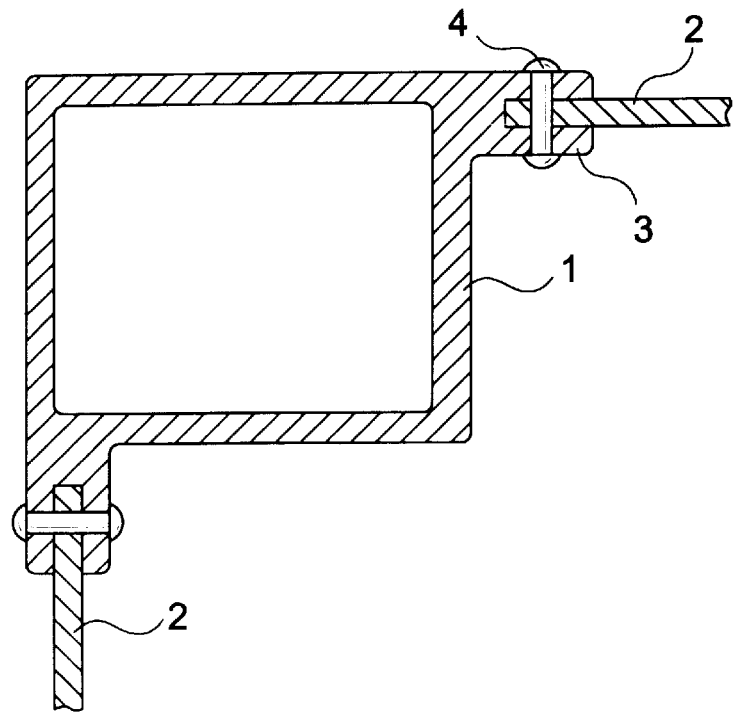
FIG. 2 is a cross-sectional view showing a significant portion of the cargo container of the present invention used in, e.g., an aircraft.

FIG. 1 is a schematic perspective view showing, as an embodiment of the present invention, the cargo container used in, e.g., an aircraft. The container shown in FIG. 1 has side walls 2 and a roof 6 respectively made of an FRP (fiber reinforced plastics) and a base 7 made of aluminum alloy installed to a frame 1 made of aluminum alloy. As for the installation of the side walls 2, the roof 6 and the base 7 to the frame 1 (as shown in FIG. 2 where the side walls are installed), one of the side walls 2 is fitted in the groove formed in the frame and fixed by an adhesive 3 applied to the faces to be inserted and by rivets 4. If a plurality of side walls 2 or panels (e.g., two FRP sidewalls 2, 3 or panels) are to be fitted in for each lateral side of the cargo container, such side walls 2, 3 or panels can be installed as shown in FIG. 3.

Figure 3:
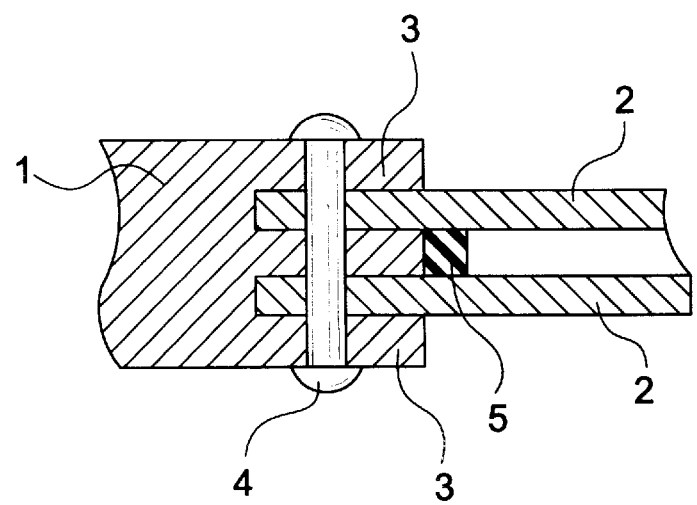
FIG. 3 is a cross-sectional view showing another significant portion of the cargo container of the present invention used in, e.g., an aircraft.

In the example shown in FIG. 3, a gap is formed between the two FRP panels 2 and 3, and such gap contains a desiccant 5 therein. The gap acts as a heat insulating layer, and may also be packed with a lightweight, preferably flame retardant heat insulating, material (such as, glass wool or foamed synthetic resin).

Figure 4:
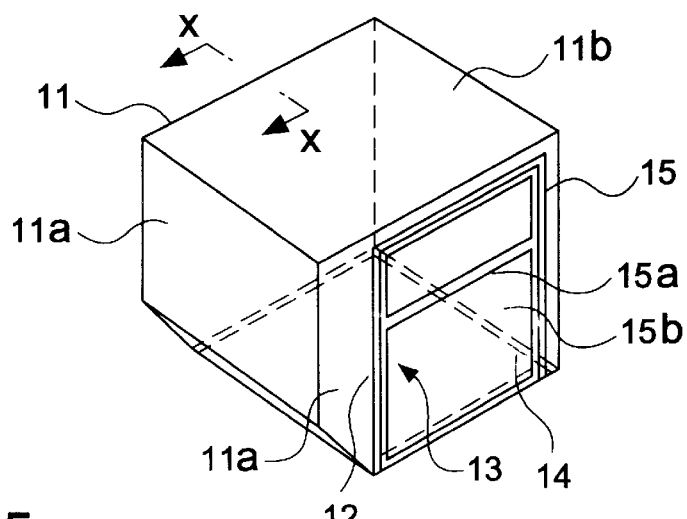
FIG. 4 is a schematic perspective view showing, as an example, the cargo container of the present invention used in, e.g., an aircraft.

FIG. 4 is a schematic perspective view showing, as an example, the cargo container of the present invention used in, e.g., an aircraft. In FIG. 4, reference number 11 denotes an integrally formed continuous FRP panel forming a side wall portion 11a as one of four side walls, and a roof portion 11b. Reference number 12 refers to a door installing frame member made of aluminum alloy, while reference number 13 denotes a base made of aluminum alloy. Reference number 14 refers to a bottom frame member made of aluminum alloy, while reference number 15 refers to a door. The door installing frame member 12 is riveted to the FRP panel 11, and is provided with functions required for opening, closing and locking the door. The door 15 has a door plate 15b made of an FRP riveted to a door frame member 15a which is made of an aluminum alloy, and is provided with functions necessary for opening, closing and locking the door. The FRP panel 11 and the base 13 are joined by riveting through the bottom frame member 14. The door 15 is also riveted to the FRP panel 11 through the door frame member 15a and the door installing frame member 12.

Figure 5:
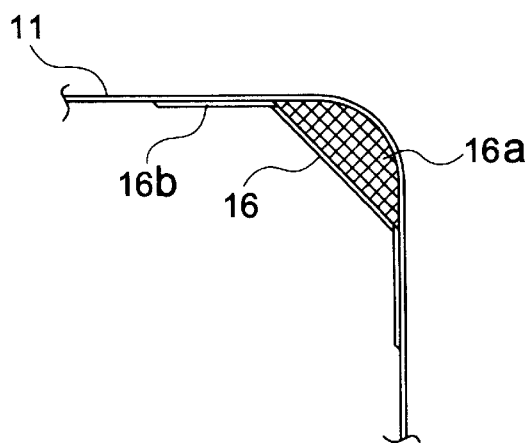
FIG. 5 is a cross-sectional view taken along line x—x shown in FIG. 4.

FIG. 5 is a schematic vertical section showing a corner between the roof and a side wall of the cargo container of the present invention. In FIG. 5, reference number 16 denotes a sandwiched structural rib with the FRP 11 as an outer skin at the inside corner. Reference number 16a denotes a core made of polyvinyl chloride foam contained in the rib 16, while reference number 16b refers to an inner skin made of FRP. A hollow structural rib (i.e., with the removal of the core 16a from the sandwiched structural rib 16) can also be used.

Figure 6:
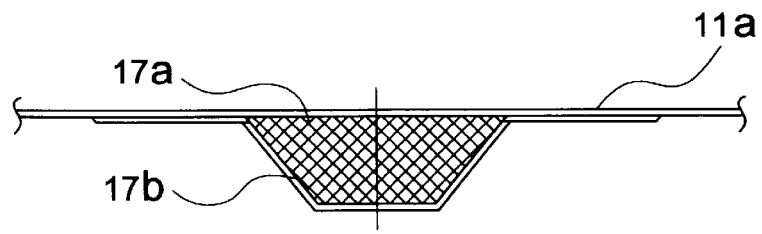
FIG. 6 is a cross-sectional view showing, as an example, the sandwiched structural rib for the cargo container of the present invention.

FIG. 6 shows a sandwiched structural rib which includes a side wall (a top side wall or a base side wall) 1a which is made of the integrally formed FRP, a core 17a partially under the side wall 11a, and an inner skin 17b provided on the side opposite to the lateral FRP plate 11a. The core 17a and the inner skin 17b can later be bonded to the lateral FRP plate 11a with the use of an adhesive or the like or can, alternatively, be simultaneously molded when the FRP is molded.

The cargo container of the present invention has a frame, side walls, a roof and a base, wherein at least the side walls, preferably the side walls and the roof, are made of the FRP. Therefore, when compared to the conventional cargo container made of aluminum alloy, the cargo container of the present invention is higher in strength and lighter in weight, and exhibits excellent heat insulation capability. The weight reduction reaches 20% if, for example, the side walls and a roof are made of a carbon fiber reinforced plastic material (CFRP) material; and if the frame is also made of CFRP, the weight reduction effect reaches about 30%. Furthermore, if the side walls and a roof are made of CFRP, the heat insulation capability is further enhanced since the heat conductivity of CFRP is 0.7 to 4.2 kcal/m·hr·°C. which is very low compared to about 200 kcal/m·hr·°C. for aluminum alloy.

The resistance against a piercing impact and heat insulation capability can be further enhanced by using a set of at least two FRP panels for each side wall or roof, with a gap formed between the two panels. The heat insulation capability can be further be enhanced if the gap is packed with a heat insulating material or contains a desiccant.

If the cargo container of the present invention has at least a set of adjacent two sides made of an integrally formed continuous FRP panel, it is higher in strength and lighter in weight, when compared to the conventional containers.

For example, if four side walls, the roof and the door are formed as an integrally formed continuous carbon fiber reinforced plastic (CFRP), and the base, bottom frame member and door frame member are made of aluminum alloy, and such part are joined using aluminum alloy rivets, then the number of parts which make up a similar container can be twenty-five, which is about one half of that of the conventional container, and the number of rivets is also about 200 which is less than one half of that of the conventional container. The time needed to manufacture and assemble such cargo container of the present invention can be considerably decreased to two thirds of the amount of time needed to manufacture and assemble the conventional container.

Furthermore, if a sandwiched structural rib or hollow structural rib made of FRP, which is a portion of the side walls or the roof or the base, is provided at the inside corner between the side walls (or between a side wall and the roof or between a side wall and the base) of an integrally formed continuous FRP panel, the strength and rigidity of the entire cargo container can be secured so as to be able to eliminate the frame and to be able to use thinner plates for further raising the weight reduction rate.

In order to achieve sufficient lightness and strength for the cargo container of this invention, the thickness or the fiber content of the FRP panel should be properly selected. The thickness of the FRP panel should be 0.1 mm to 1.0 mm (preferably, 0.2 mm to 0.5 mm). If the thickness of the FRP panel is less than 0.1 mm, the strength of the FRP panel becomes lower than that of an aluminum panel, which can be readily broken when hit with forks of forklifts. If the thickness of the FRP panel is larger than 1.0 mm, the weight thereof becomes equal to or heavier than that of the side walls or roof made of aluminum alloy.

On the other hand, the fiber content of the FRP panel is preferably 25–65% (i.e., $25 \leq V_f \leq 65$) or more preferably, 30–65% (i.e., $30 \leq V_f \leq 65$). If $V_f$ is less than 25%, in order to achieve a predetermined strength, the thickness must be large; as such, the container cannot be light in weight. As for the FRP of a high fiber content, although high strength can be expected, uniform impregnation with matrix resin is difficult or substantially impossible at the manufacturing stage.

While the invention has been particularly shown and described in reference to preferred embodiments thereof, it will be understood by those skilled in the art that changes in form and details may be made therein without departing from the spirit and scope of the invention.

What is claimed is:

1. A cargo container comprising:
   side walls made of CFRP (carbon fiber reinforced plastic) panel;

a roof; and a base, wherein at least two adjacent sides of said side walls and said roof are constituted of an integrally formed continuous CFRP panel, wherein the thickness of said side walls, except at an intersection of the side walls and around holes for rivets or bolts, is between 0.1 and 1.0 mm, wherein the thickness of said CFRP panel around holes or rivets is greater than other portions of said CFRP panel, and wherein the tensile strength and elongation at break of reinforcing fibers in said CFRP are at least 450 kgf/mm2 and at least 1.7%, respectively.

2. The cargo container of claim 1, wherein said side walls and said roof are made of an FRP.

3. The cargo container of claim 2, wherein said container has an internal frame and said frame and said base are made of aluminum alloy.

4. The cargo container of claim 1, wherein said side wall comprises at least two FRP panels as outer skin with a gap formed therebetween.

5. The cargo container of claim 4, wherein the gap is packed with a heat insulating material.

6. The cargo container of claim 4, wherein a desiccant is contained in the gap.

7. The cargo container of claim 1, wherein at least two adjacent sides of said side walls, said roof and said base are comprised of an integrally formed continuous FRP panel.

8. The cargo container of claim 7, wherein said at least two adjacent sides are side walls.

9. The cargo container of claim 7, wherein said at least two adjacent sides are one of said side walls and said roof.

10. The cargo container of claim 7, wherein said at least two adjacent sides are one of said side walls and said base.

11. The cargo container of claim 7, wherein at least one of said side walls, the roof and said base are made of an integrally formed continuous FRP panel.

12. The cargo container of claim 7, wherein at least portions of said at least two sides are comprised of integrally formed continuous FRP panels as the outer skin with a gap formed therebetween.

13. The cargo container of claim 7, wherein said integrally formed continuous FRP panel is reinforced with one of a sandwiched structural rib and hollow structural rib having FRP as the outer skin.

14. The cargo container of claim 13, wherein the container is reinforced with one of said sandwiched structural rib and hollow structural rib at an inside corner thereof.

15. The cargo container of claim 7, wherein the reinforcing fibers in the FRP are continuous through at least one set of two adjacent sides.

16. The cargo container of claim 1 or 7, wherein said FRP panel is reinforced with a woven fabric of carbon fibers.

17. The cargo container of claim 1 or 7, wherein said FRP panel is reinforced with a plain fabric of carbon fibers.

18. The cargo container of claim 1 or 7, wherein a matrix resin in said FRP contains a flame proofing agent.

19. The cargo container of claim 1 or 7, which is used for an aircraft.

20. The cargo container of claim 1, wherein the fiber content of said FRP is $25 \leq V_f \leq 65$.

21. The cargo container of claim 1, wherein the fiber content of said FRP is $30 \leq V_f \leq 65$.

22. The cargo container of claim 1, wherein the thickness of said FRP is $0.2 \leq T \leq 0.5$ mm.

23. The cargo container of claim 1, wherein the thicker portions are made by additionally laminating prepregs or reinforcing fibers.

24. The cargo container of claim 1, wherein the CFRP panel is a single panel.

* * * * *